United States Patent [19]

Lawton

[11] 4,254,233
[45] Mar. 3, 1981

[54] ACRYLIC FIBER AND THE METHOD FOR MAKING THE SAME

[75] Inventor: Ernest L. Lawton, Durham, N.C.

[73] Assignee: Monsanto Company, St. Louis, Mo.

[21] Appl. No.: 62,863

[22] Filed: Aug. 1, 1979

[51] Int. Cl.³ .................... C08F 8/30; C08L 79/00
[52] U.S. Cl. ............................ 525/123; 525/128; 525/131; 525/907
[58] Field of Search ............... 525/123, 128, 131, 907

[56] References Cited

U.S. PATENT DOCUMENTS

| | | | |
|---|---|---|---|
| 3,639,353 | 2/1972 | Brown | 260/77.5 |
| 4,042,558 | 8/1977 | Bonin | 525/123 |
| 4,169,866 | 10/1979 | Bonin | 525/131 |

FOREIGN PATENT DOCUMENTS 7013255  3/1971  Netherlands ............... 525/128

Primary Examiner—Paul Lieberman
Attorney, Agent, or Firm—Robert L. Broad, Jr.

[57] ABSTRACT

A reinforced acrylic fiber and the method for making the same wherein a diisocyanate selected from the group consisting of:

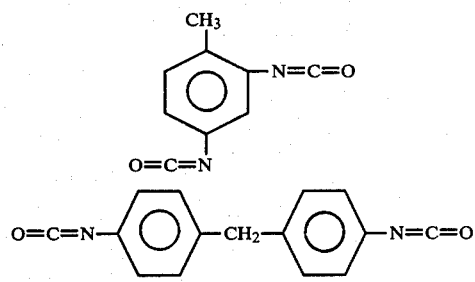

is polycondensed to form a polycarbodiimide in the presence of a spinning dope made up of dimethylacetamide containing 10 to 30 weight percent of acrylic polymer dissolved therein. The polycarbodiimide is present in discrete particles in the spinning dope. The spinning dope containing the polycarbodiimide is extruded to form fibers which have good hot-wet properties.

7 Claims, No Drawings

ACRYLIC FIBER AND THE METHOD FOR MAKING THE SAME

BACKGROUND OF THE INVENTION a. Field of the Invention

This invention relates to improved acrylic fibers and the method of making the same.

b. Description of the Prior Art

It is well known that conventional acrylic fibers have generally poor hot-wet performance. Symptoms of these poor hot-wet properties are low resistance to deformation, high elongation or creep, and small restoring forces after deformation. Under certain dyeing conditions, the fibers become distorted and thus yield fabric with an undesirable appearance.

SUMMARY OF THE INVENTION

Acrylic fibers and methods for making the same wherein a diisocyanate selected from the group consisting of:

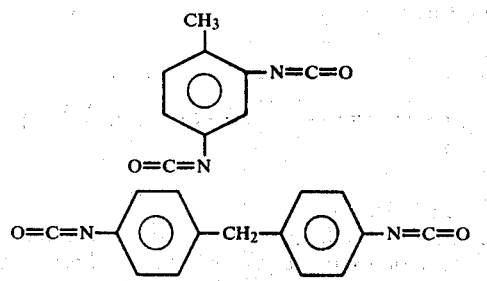

is polycondensed in the presence of a spinning dope made up of dimethylacetamide having dissolved therein 10 to 30 weight percent of acrylic polymer. This reaction forms a polycarbodiimide which is in the form of discrete particles in the spinning dope. The dope containing the polycarbodiimide is then spun to form acrylic fibers which have good hot-wet properties.

DETAILED DESCRIPTION OF THE INVENTION

In the process of this invention, polycarbodiimides are synthesized from diisocyanates in dimethylacetamide solutions of acrylonitrile. The following equation illustrates the reaction.

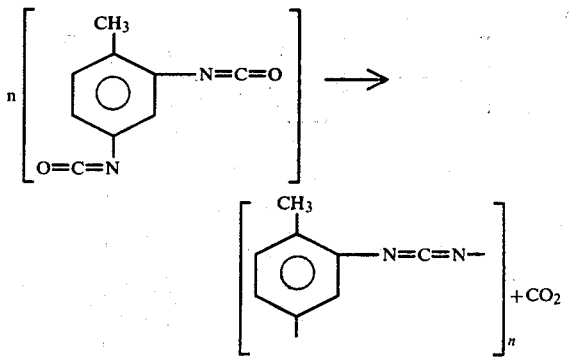

where n is 3 to 200.

The polycarbodiimide formed is in the form of a discrete phase in the polymer solution, the polycarbodiimide appearing to be present as particulates with a mean longest dimension of about 1 micron or less, dispersed throughout the spinning solution. The spinning solution is then spun into fibers under conventional conditions. Toluene diisocyanate or diphenyl methene diisocyanate may be used to form the polycarbodiimide, the toluene diisocyanate being preferred.

The spinning solution is made up of a conventional fiber-forming acrylic polymer dissolved in a suitable solvent, such as dimethylacetamide or dimethylformamide. Dimethylacetamide is preferred. The acrylic polymer is made up of at least 35% acrylonitrile with one or more other mono-olefinic monomers copolymerized with the acrylonitrile. Preferably, the polymer is a conventional acrylic polymer containing at least 85 weight percent of acrylonitrile.

The diisocyanate is polycondensed in situ in the spinning dope to form the polymer which enhances the hot-wet properties of fibers formed from the dope, without adversely affecting other properties of the fibers. The spun fibers will contain 5 to 40 weight percent of the polycarbodiimide and will preferably contain 5 to 20 weight percent, the polycarbodiimide being in the form of discrete particles dispersed throughout the fibers.

EXAMPLE

The reactions described herein were conducted in a 1 liter resin kettle equipped with a mechanical stirrer and blanketed with a nitrogen atmosphere. The stirrer used was a stainless steel pitch blade turbine type, operated at 350 rpm.

A polymer of about 93% acrylonitrile and about 7% vinyl acetate was dried overnight at 55° C. under 0.1 mm Hg pressure. The dried polymer, 18.32 g, was dissolved in 164.9 g of dried dimethylacetamide by heating it to 55° C. under a nitrogen blanket to form a spinning solution or dope. The dope was then cooled to room temperature.

The required quantity of the diisocyanate was dissolved in the spinning solution and an effective amount of a catalyst, 0.1 ml of 1-ethyl-3-methyl phospholine oxide, was added to the dope. The dope was stirred at 55° C. for 60 minutes and allowed to cool to room temperature for film casting. The cooled dope was spread on glass plates using a Gardner knife and the plates were heated in a 90° C. forced air oven for 60 minutes.

The films were peeled from the glass plates and given three 1 hour extractions in refluxing methanol. The films were then washed overnight in running tap water and dried at 65° C. under house vacuum.

The results shown in Table 1 were obtained using a Vibron Dynamic Mechanical Analyzer with the film samples tested being about 0.20 mm×5 mm×50 mm, the tests being carried under both wet and dry conditions.

The amount of polycarbodiimide in the fiber is about 5 to 40 weight percent of the fiber weight and is preferably 5 to 20 weight percent.

TABLE 1

| | | | Storage Modulus (Dynes/cm$^2$ × 10$^{10}$) | |
|---|---|---|---|---|
| Run | Additive | Wt. % Additive | 93° C. - Wet | 150° C. - Dry |
| 1 | A* | 16.7 | 0.14 | 0.060 |
| 2 | B** | 16.7 | 0.18 | 0.10 |

TABLE 1-continued

| Run | Additive | Wt. % Additive | Storage Modulus (Dynes/cm² × 10¹⁰) | |
| --- | --- | --- | --- | --- |
| | | | 93° C. - Wet | 150° C. - Dry |
| 3 | None | None | 0.087 | 0.060 |

*formed from diphenyl methane diisocyanate
**formed from toluene diisocyanate

This table illustrates the improvement obtained in hot-wet modulus when the polycarbodiimide is present in the film. Fibers will have greater hot-wet modulus values for the reason that the fiber making process includes drawing steps, whereas the films of this example were not drawn.

What is claimed is:

1. The method of forming acrylic fibers having good hot-wet properties, comprising:
   a. polycondensing a diisocyanate selected from the group consisting of:

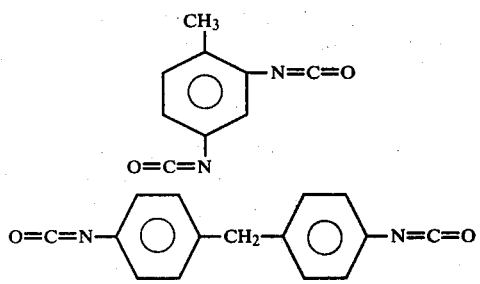

to form a polycarbodiimide in the presence of a spinning dope made up of dimethyl acetamide containing 10 to 30 weight percent of acrylic polymer dissolved therein, and
   b. extruding the solvent containing the acrylic polymer and the polycarbodiimide to form a fiber, said fiber containing 5 to 40 weight percent of said polycarbodiimides in the form of discrete particles dispersed in the fiber.

2. The method of claim 1 wherein the polycarbodiimide is

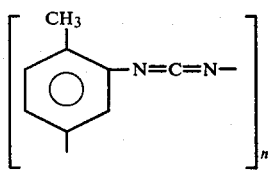

and n is 3 to 200.

3. The method of claim 1 wherein the polycarbodiimide is

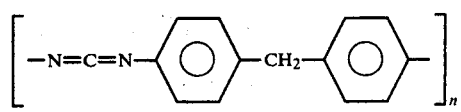

and n is 3 to 200.

4. An acrylic fiber containing 5 to 40 weight percent of a polycarbodiimide selected from the group consisting of

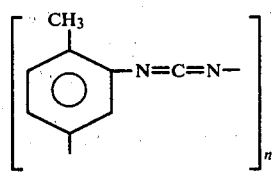

where n is 3 to 200;

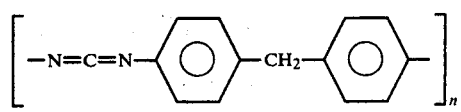

where n is 3 to 200;
said polycarbodiimide being present in the fiber in the form of discrete particles dispersed throughout the fiber.

5. The fiber of claim 4 wherein the amount of polycarbodiimide is 5-20 weight percent.

6. The fiber of claim 5 wherein the polycarbodiimide is

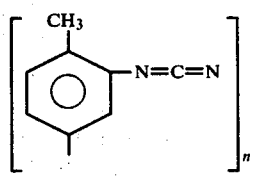

7. The fiber of claim 5 wherein the polycarbodiimide is

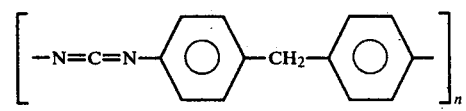

* * * * *